Jan. 10, 1956     I. WOLFF     2,730,713
POSITION FINDER SYSTEM OF RADIO PULSE
TYPE WITH VERNIER INDICATOR TUBE
Original Filed March 20, 1941     2 Sheets-Sheet 1
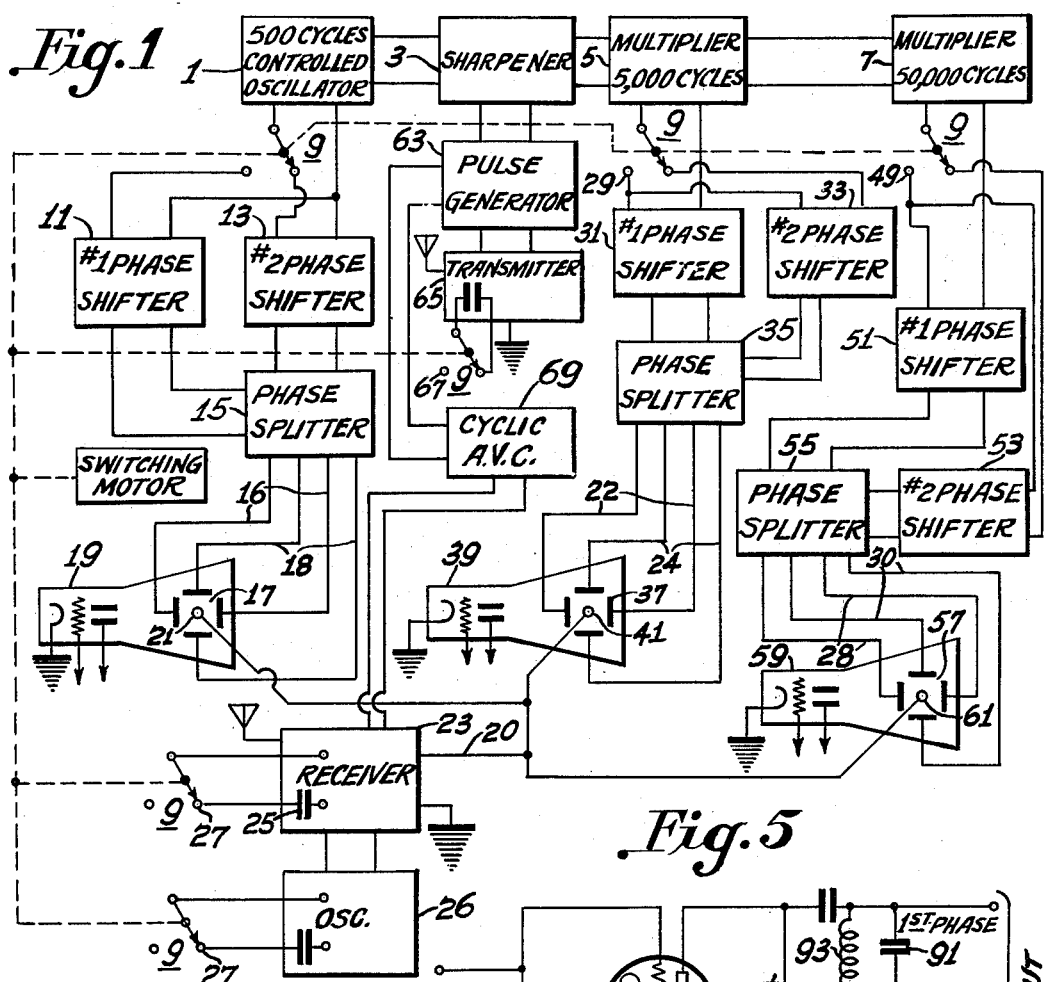
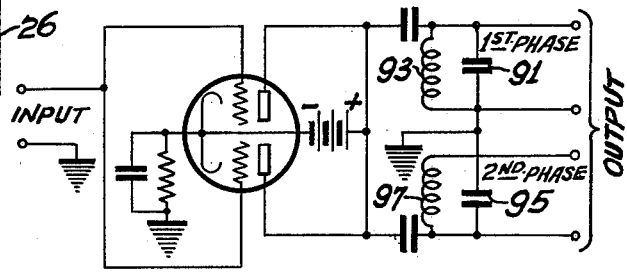
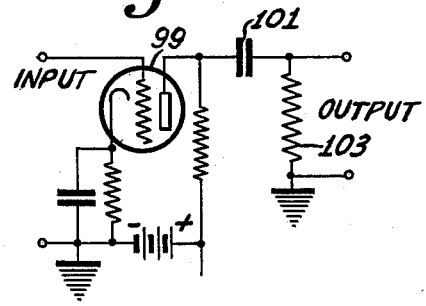
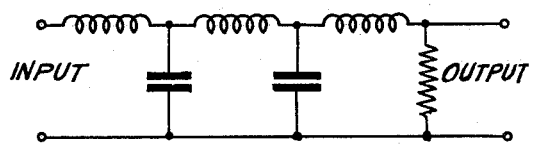
INVENTOR
*Irving Wolff*
BY
ATTORNEY Jan. 10, 1956               I. WOLFF               2,730,713
POSITION FINDER SYSTEM OF RADIO PULSE
TYPE WITH VERNIER INDICATOR TUBE
Original Filed March 20, 1941               2 Sheets-Sheet 2
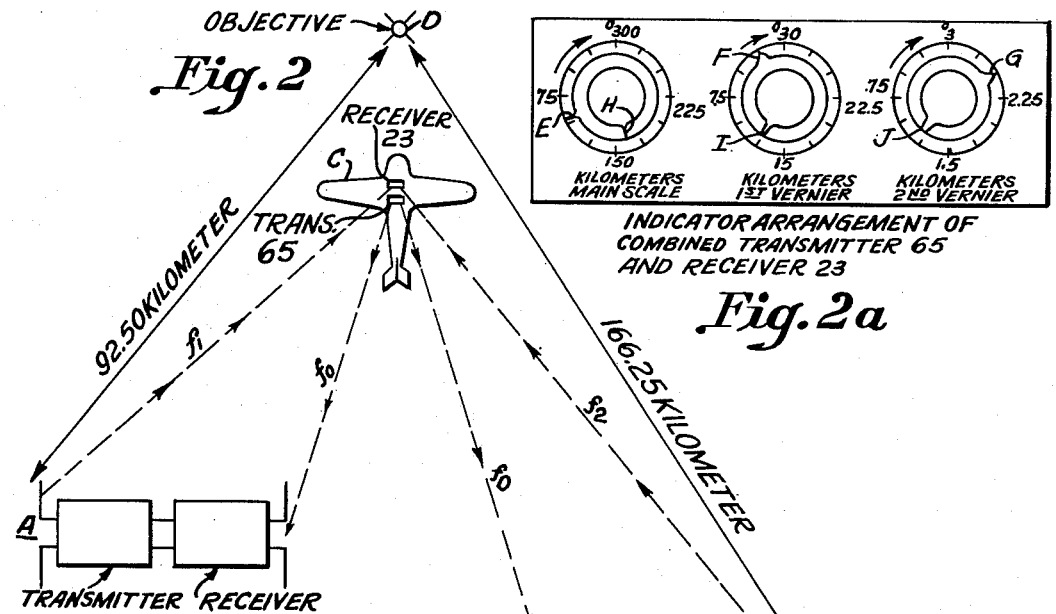
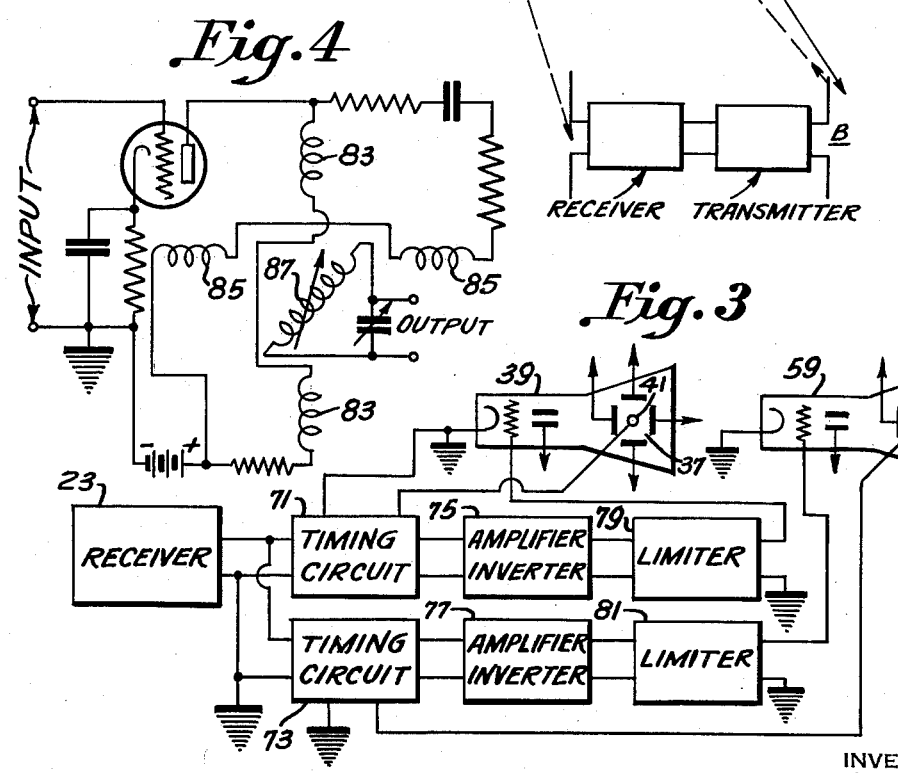
INVENTOR
*Irving Wolff*
BY
ATTORNEY

2,730,713
POSITION FINDER SYSTEM OF RADIO PULSE TYPE WITH VERNIER INDICATOR TUBE

Irving Wolff, Princeton, N. J., assignor to Radio Corporation of America, a corporation of Delaware Original application March 20, 1941, Serial No. 384,323, now Patent No. 2,493,097, dated January 3, 1950. Divided and this application December 30, 1947, Serial No. 794,706

7 Claims. (Cl. 343—17.1)

This application is a division of application Serial No. 384,323, filed March 20, 1941, in the name of Irving Wolff, entitled "Position Finder," now Patent No. 2,493,097, issued January 3, 1950.

This invention relates to position finders and particularly to a position finder in which position is determined by observing the time required for radio pulses, originating at the unknown location, to travel to and from a pair of known locations.

In a copending application, Serial No. 329,434, filed April 13, 1940, for "Position Determining System," now Patent No. 2,405,238, by Stuart W. Seeley, is described a position indicator in which an objective is located by radiating radio pulses from a craft bound for the objective, by receiving the pulses after they are repeated from known locations, and by then indicating the objective as a function of the pulse transmission or propagation time. The instant invention, while utilizing the broad concept of the Seeley application, provides a number of improvements. These improvements will be set forth as among the principal objects of this invention.

One of the objects of the invention is to provide an improved means for determining the position of a vehicle by timing the propagation of radio pulses to two known points. Another object is to provide an improved position finder employing two or more accurate vernier scales for timing pulse transmission. Another object is to provide means whereby the "time-distance location" of an objective and a vehicle may be indicated on the main and vernier scales of two or more cathode ray tubes.

The invention will be described by referring to the accompanying drawings in which Fig. 1 is a schematic block diagram of the combined transmitter and receiver used on the mobile station of one embodiment of the invention; Fig. 2 is a schematic diagram illustrating the operation of the invention; Fig. 2A is a sketch of the indicator used at the mobile station; Fig. 3 is a schematic circuit diagram of a modification used for brightening the cathode ray trace of the indicator; Fig. 4 is a schematic diagram of a phase shifter; Fig. 5 is a diagram of a phase splitter employed at the mobile station; Fig. 6 is a schematic diagram of a sharpener which forms a portion of the mobile station; and Fig. 7 is a circuit diagram of a delay network. Similar reference numerals are applied to similar elements throughout the drawings.

Fig. 1 shows a 500 cycle frequency controlled oscillator 1 connected through a sharpener 3 to a frequency multiplier 5, which, by way of example, may multiply the frequency of the first oscillator ten times. The frequency multiplier 5 is connected to a second frequency multiplier 7, which may also multiply ten times. Thus there are made available three currents of 500, 5000 and 50,000 cycles. The oscillator 1 is connected alternately, by a synchronizing switch 9, to a pair of phase shifters 11 and 13. The phase shifters 11 and 13 are connected through a phase splitter 15 and the lines 16 and 18 to the rotational deflection electrodes 17 of a first or main cathode ray tube 19. The cathode ray tube includes a radial deflecting electrode 21 which is connected through the line 20 to the output of a radio pulse receiver 23. The radio receiver may be any conventional type provided with tuning means 25 for adjusting the receiver alternately to a pair of pulses of different carrier frequency. If the receiver 23 is a superheterodyne, its input circuits and its local oscillator 26 may be tuned by capacitors connected and disconnected by suitable contacts 27 on the synchronizing switch 9.

The first multiplier 5 is connected alternately, by contacts 29 operated by the synchronizing switch, to a pair of phase shifters 31 and 33. The phase shifters 31, 33 are connected through a phase splitter 35 and the lines 22 and 24 to the rotational deflection electrodes 37 of a second or vernier cathode ray tube 39 or fractional indicator. The radial deflecting electrode 41 of the cathode ray tube 39 is connected through the line 20 to the radio pulse receiver 23. The second multiplier 7 is connected alternatively, by contacts 49 operated by the synchronizing switch 9, to a pair of phase shifters 51, 53. These phase shifters 51, 53 are connected through a phase splitter 55 and the lines 28 and 30 to the rotational deflecting electrodes 57 of a third or vernier cathode ray tube 59 or fractional indicator. The radial deflecting electrode 61 is connected through the line 20 to the output of the radio receiver 23.

The sharpener 3 is connected to a pulse generator 63. The output of the pulse generator is applied to the transmitter 65, which may be arranged to radiate alternately pulses of different carrier frequencies. The carrier frequencies may be selected by switch contacts 67 which may be operated by the synchronizing switch 9. A suitable network 69 may be connected to the pulse generator for deriving therefrom a cyclic AVC of the type described in the copending application Serial No. 267,475, filed April 12, 1939, by Rogers M. Smith, for Radio Echo Distance Measuring Devices, now Patent No. 2,498,381, issued February 21, 1950.

The operation of the system is as follows: A pair of radio repeater stations A and B are established at known locations indicated in Fig. 2. For each cycle of the 500 cycle oscillator 1, which along with the apparatus of Fig. 1 is located on the airplane C, pulses of radio frequency energy are radiated from the transmitter 65. The carrier frequency of these pulses is made $f_0$. The outgoing pulses of frequency $f_0$ will travel at 300,000 kilometers per second to be received at the relay stations, retransmitted by the relay station A and by the relay station B, converted into distinctive carriers $f_1$ and $f_2$ at the said relay stations, and thereafter received by the receiver 23, which is alternately operated at the two frequencies by means of the synchronous switch 9.

At the instant of the initial radiation the phase splitters 15, 35 and 55 apply potentials in quadrature phase to the respective rotational deflecting electrodes 17, 37, 57 of the cathode ray tubes 19, 39, and 59. These potentials cause the cathode ray beams to rotate in a clockwise direction as indicated in Fig. 2a. The beams in the respective cathode ray tubes will complete a rotational cycle in 2 milliseconds, .2 millisecond, and .02 millisecond, respectively, and will therefore provide a decade type of scale in which the main scale represents 300 kilometers, the first vernier scale 30 kilometers, and the second vernier scale 3 kilometers. The scales are dependent only upon the accuracy of the main frequency controlled oscillator and are independent of the carrier frequency.

Thus the cathode ray beams are rotated at constant angular speed and in the several cathode ray tubes at relative rates of 1:10:100 to provide accurate and easily readable scales. Now assume that the airplane C is to fly to an objective D which is 92.50 kilometers from A and 166.25 kilometers from B. The phase shifters 11, 31 and 51, which control the phase of the beams in their respective tubes 19, 39 and 59, are adjusted until the initial pulses of carrier frequency $f_0$ are retarded to 92.5 kilometers on the main scale, 2.5 kilometers on the first vernier, and 2.5 kilometers on the second vernier. Since 92.5 can not be read accurately on the main scale, it is only necessary to adjust the indication E to some point as near 92.5 as can be estimated. The indication F on the first vernier is determined by dividing 30 into 92.5 to obtain the remainder of 2.5 which is set as near as can be estimated. The indication G on the second vernier is set at exactly 2.5 which is determined by dividing 3 into 92.5 to obtain the remainder; i. e. 2.5.

In a similar manner, the indications H, I, J for the pulses of carrier which operates relay station B on frequency $f_2$ are set up to correspond to 166.25 kilometers, 16.25 (166.25÷30=150+16.25) kilometers, and $$1.25(166.25 \div 3 = 55 + 1.25)$$

kilometers, respectively. If the relay stations interpose delays, within the relay apparatus, these delay times are constants which should be added to the set up distances. This may be determined by setting up the mobile device within a known distance from the relay and by noting the difference between the indicated and actual distances. If the airplane starts to fly toward an objective, the pulses radiated to A and to B will be retransmitted to the airplane and will be indicated on the several scales. As the distances increase the received indications on the main scale will approach the zero or other predetermined reference point, while the indications rotate ten times as fast and one hundred times as fast on the first and second verniers, respectively. If the airplane is flown so that the received indications E, F, G, H, I, and J all appear coincidentally at the zero or reference point on their respective scales, then the objective will be reached and the airplane position will be known to within the accuracy of the final vernier scale. It is not necessary to observe all six indications simultaneously because the indications may be observed in pairs as follows, E—H, then F—I, and finally the last vernier G—J. In the illustrative example, the distances may easily be read to the order of .1 kilometer or 100 meters.

It should be understood that the synchronous switch simultaneously operates the receiver at the proper carrier frequency and therefore, tunes the receiver to the proper ground station, and establishes and proper phasal relations for the known distances. Instead of using one carrier frequency at the mobile transmitter, two carrier frequencies $f_1$ and $f_2$ may be used. In this case a single carrier frequency $f_0$ may be used for retransmission from both relays, allowing the receiver to be fixedly tuned. The synchronous switch is then used to tune the transmitter and to select the proper phasing circuits.

To one familiar with radio echo distance measurements it will be clear that the advancement of the phase of the initial pulses will be gradually overcome as the pulses are delayed by their respective transit times until at the objective the initial advancement is exactly balanced by the time of transit. The transit times for the known distances may be readily predetermined by dividing twice the distance by the velocity of light; i. e.

$$\frac{2 \text{ times} \times \text{in meters}}{300} = \text{time in microseconds}$$

The scales may be made to correspond to any desired time or distance, which may be indicated in any units, by choosing the proper oscillator frequency.

The received indications may be distinguished in a number of ways, for example, the radius of the sweeps may be slightly different by introducing some attenuation in one of the sets of phase shifters. The cyclic AVC is used to decrease the receiver sensitivity at the instant of the outgoing pulse and thereafter to increase or restore the receiver sensitivity. While the receiver output may be sufficient to deflect radially the cathode ray beam, the visibility of the radial trace may be insufficient. In this case it is desirable to increase the intensity. The brilliancy of the radial trace may be increased by applying simultaneously to the cathode ray tube grid and radial deflecting electrodes voltages of opposite phase.

These voltages may be obtained by inserting the circuit of Fig. 3 between the receiver and the second and third cathode ray tubes. The receiver output is applied to timing circuits 71, 73. The timing circuits are connected through amplifier inverters 75, 77, respectively, to limiters 79, 81, respectively. Voltages from the timing circuit 71 are applied to the radial deflecting electrode 41 of tube 39; voltages from the second timing circuit 73 are applied to the radial deflecting electrode 61 of tube 59. The output from the first limiter 79 is applied to the grid of the tube 39; the output from the second limiter 81 is applied to the grid of tube 59. The foregoing circuit is so arranged that voltages of opposite phase are applied to the grid and deflecting electrodes so that the intensities of the respective beams of the cathode ray tubes are increased during radial deflections. If the foregoing precautions are not taken the radial trace on the second vernier tube will be found quite faint because the beam in the second vernier tube rotates 100 times for one radial deflection. The first vernier tube employs a beam which rotates ten times for one radial deflection and therefore, while its radial trace may be sufficiently intense, increasing its intensity is preferable. These difficulties do not appear in the operation of the main cathode ray tube because the radial deflections of its beam occur once for every rotation of the beam.

Most of the units employed in the circuit of Fig. 1 are well known to those skilled in the art. The 500 cycle oscillator may employ a tuning fork, magnetostrictive element or any known means for controlling its frequency. The phase shifters may be of the type illustrated in the schematic diagram of Fig. 4. In this circuit two phase currents are applied to the stator coils 83 and 85, respectively. The variable phase current is determined by the position of the rotating coil 87. This type of phase shifter is disclosed in copending application Serial No. 196,863, filed March 19, 1938, by Irving Wolff, now Patent No. 2,407,198, issued September 3, 1946, for "Distance and Directional Determination System."

While the phase splitting circuits may employ serially connected capacitors and resistors the circuit of Fig. 5 is preferred. In this circuit the capacitor 91 and inductor 93 are tuned to shift the phase 45° while the capacitor 95 and inductor 97 are tuned to shift the phase 45° in the opposite direction whereby quadrature phase currents are obtained to produce a rotating field which rotates the cathode ray beam.

The sharpener circuit is illustrated in Fig. 6 in which the electronic tube 99 is biased to operate as a Class C stage. The voltages of sinusoidal form supplied to the input produce a current of square wave form in the output of the tube. These currents are differentiated by the network including capacitor 101 and resistor 103. The pulse generator and transmitter may be of the type disclosed in copending application Serial No. 182,418, filed December 30, 1937, by Irving Wolff, now Patent No. 2,403,624, issued July 9, 1946, for "Apparatus for and Method of Pulse Keying." It should be understood that the invention is not limited to any particular type of pulse generator or transmitter. Likewise, the receiver may be of any known type. In the event that the circuit of Fig. 3 is employed the limiter may be any of the thermionic tubes operating on cut-off or saturation. The timing circuit may be omitted if the time delay through the amplifier inverter and limiter is negligible. In the event that a timing circuit is required, a properly terminated filter of the type shown in Fig. 7 may be used.

While the described system is based upon frequency multiplication for obtaining the vernier indications, the several indications may be obtained by frequency division. The relay stations may be omitted by substituting suitable reflectors, for example, as described in applicant's copending U. S. application, Serial No. 395,739, filed May 29, 1941. Furthermore, the invention is not limited to circular scales but may utilize linear scales.

I claim as my invention:

1. In a distance measuring system, means for transmitting an electrical pulse at a certain repetition rate whereby the transmitted pulses have a certain repetition period, means for receiving said pulses after reflection, a cathode ray tube indicator having a screen and having means for producing a cathode ray, means for deflecting said cathode ray along a predetermined path on said screen with said deflection along said path being repeated at a periodic rate that is a multiple of said pulse repetition rate, means for deflecting the cathode ray of said tube to produce an indication on said screen at the time of reception of said received pulses, means in addition for increasing the intensity of said cathode ray at said certain repetition rate and for a duration short compared to said certain repetition period and phase so that said increase in intensity occurs during the time said received pulse is applied from said receiving means to said indicator.

2. In a distance measuring system, means for transmitting an electrical pulse at a certain repetition rate whereby the transmitted pulses have a certain repetition period, means for receiving said pulses after reflection, a cathode ray tube indicator having a screen and having means for producing a cathode ray and directing it against said screen, means for deflecting said cathode ray along a predetermined path on said screen with said deflection along said path being repeated at a periodic rate that is a multiple of said pulse repetition rate, means for applying the received pulses to said cathode ray tube and means for causing said applied pulses to produce a momentary deflection of the cathode ray, means for producing control pulses recurring at said certain repetition rate and each having a duration that is short compared with said repetition period, means for causing said control pulses to increase the intensity of said cathode ray at said certain repetition rate and phase so that said increase in intensity occurs at the time said received pulse is applied from said receiving means to said indicator.

3. In a distance measuring system, means for transmitting an electrical pulse at a certain repetition rate whereby the transmitted pulses have a certain repetition period, means for receiving said pulses after reflection, a cathode ray tube indicator having a screen and having means for producing a cathode ray and directing it against said screen, means for deflecting said cathode ray along a time measuring trace at a periodic rate that is a multiple of said pulse repetition rate, means for applying the received pulses to said cathode ray tube and means for causing said applied pulses to produce a momentary deflection of the cathode ray, means for producing control pulses recurring at said certain repetition rate and each having a duration that is approximately the same duration as each of the received pulses applied to the cathode ray tube, means for causing said control pulses to brighten said trace at said certain repetition rate and phased so that said brightening occurs at the time said received pulse is applied from said receiving means to said indicator.

4. In a distance measuring system, means for transmitting an electrical pulse at a certain repetition rate whereby the transmitted pulses have a certain repetition period, means for receiving said pulses after reflection, a cathode ray tube indicator having a screen and having means for producing a cathode ray and directing it against said screen, means for deflecting said cathode ray along a time measuring trace at a periodic rate that is a multiple of said pulse repetition rate, means for applying the received pulses to said cathode ray tube and means for causing said applied pulses to produce a momentary deflection of the cathode ray, said cathode ray tube having a cathode electrode and a ray intensity control electrode, means for producing control pulses recurring at said certain repetition rate and each having a duration that is short compared with said repetition period, and means for applying said control pulses to one of said electrodes with said control pulses so phased and of such polarity that they are on said one electrode at the same time said received pulses are being applied to the cathode ray tube to cause the momentary deflection indication to be brightened.

5. In a distance measuring system, means for transmitting an electrical pulse at a certain repetition rate whereby the transmitted pulses have a certain repetition period, means for receiving said pulses after reflection, a cathode ray tube indicator having a screen and having means for producing a cathode ray and directing it against said screen, said tube also having a cathode, a cathode-ray intensity control electrode and a radial deflecting electrode, means for deflecting said cathode ray along a time measuring trace at a periodic rate that is a multiple of said pulse repetition rate, means for applying the received pulses to said radial deflecting electrode for causing said applied pulses to produce a momentary deflection of the cathode ray, means for producing control pulses recurring at said certain repetition rate and each having a duration that is short compared with said certain repetition period, and means for applying said control pulses to the cathode ray tube to make said control electrode more positive with respect to the cathode at the same time said received pulses are being applied to said radial deflecting electrode whereby the momentary deflection indication is brightened.

6. In a distance measuring system, means for transmitting an electrical pulse at a certain repetition rate, means for receiving said pulses after reflection, a cathode ray tube indicator having a screen and having means for producing a cathode ray and directing it against said screen, said tube also having a cathode, a cathode-ray intensity control electrode and a radial deflecting electrode, means for deflecting said cathode ray along a time measuring trace at a periodic rate that is a multiple of said pulse repetition rate, means for applying the received pulses to said radial deflecting electrode for causing said applied pulses to produce a momentary deflection of the cathode ray, means for producing control pulses recurring at said certain repetition rate and each having a duration of the same order as each of the pulses applied to said radial reflecting electrode, and means for applying said control pulses to the cathode ray tube to make said control electrode more positive with respect to the cathode at the same time said received pulses are being applied to said radial deflecting electrode whereby the momentary deflection indication is brightened.

7. In a distance measuring system, means for transmitting an electrical pulse at a certain repetition rate whereby the transmitted pulses have a certain repetition period, means for receiving said pulses after reflection, a cathode ray tube indicator having a screen and having means for produing a cathode ray and directing it against said screen, means for deflecting said cathode ray repeatedly along a predetermined path on said screen at a periodic rate that is a multiple of said pulse repetition rate, means for applying the received pulses to said cathode ray tube indicator to produce an indication along said path at the time of arrival of said pulses, means in addition for increasing the intensity of said cathode ray at said certain repetition rate and for a duration short compared to said certain repetition period and phased so that said increase in intensity occurs during the time said received pulse is applied from said receiving means to said indicator.

References Cited in the file of this patent

UNITED STATES PATENTS

| 2,405,238 | Seeley | Aug. 6, 1946 |
| 2,405,239 | Seeley | Aug. 6, 1946 |
| 2,408,414 | Donaldson | Oct. 1, 1946 |
| 2,433,838 | Elie et al. | Jan. 6, 1948 |

FOREIGN PATENTS

| 108,556 | Australia | Sept. 28, 1939 |